Patented Oct. 21, 1924.

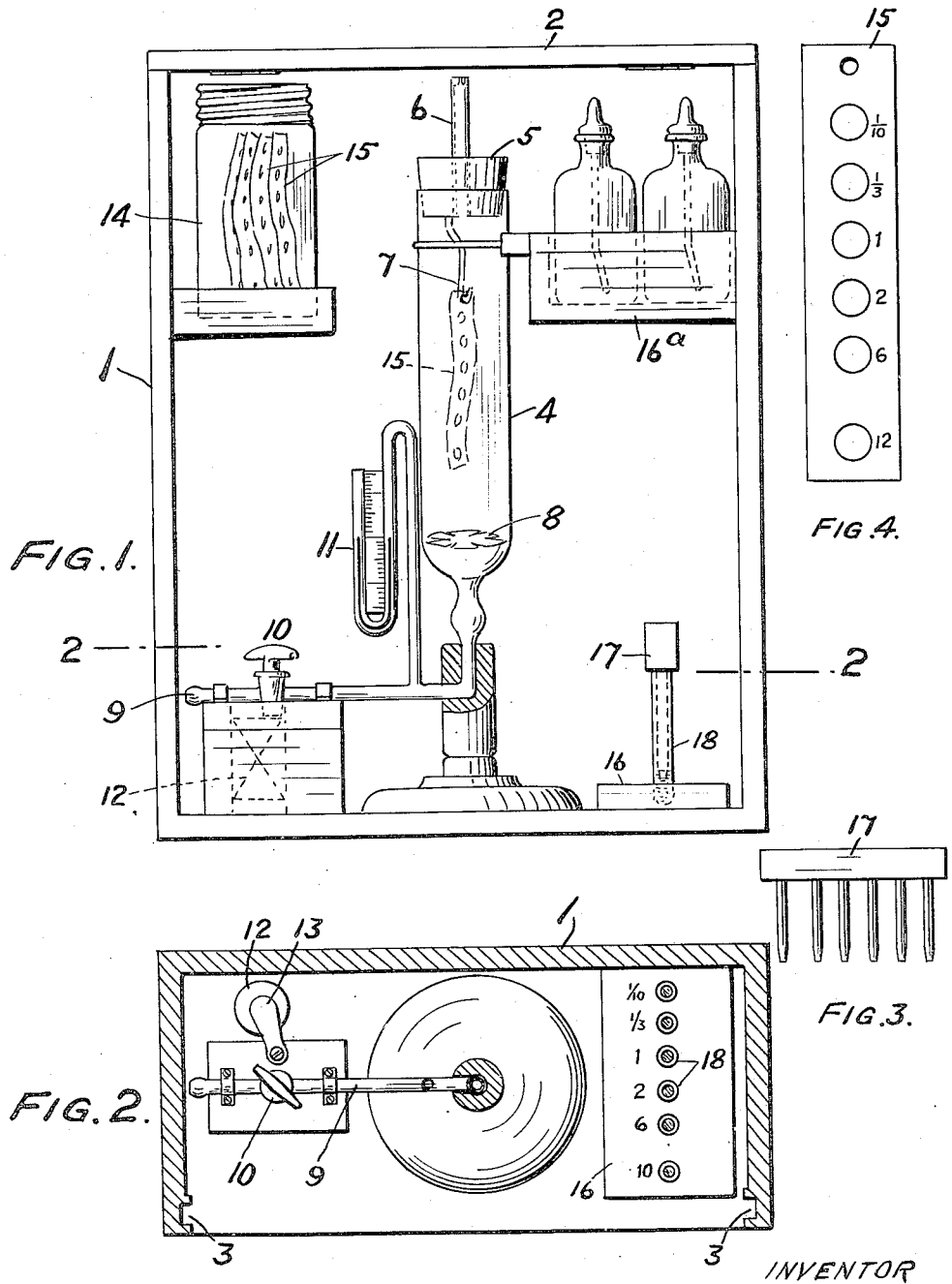

1,512,893

UNITED STATES PATENT OFFICE.

WALTER H. FULWEILER, OF WALLINGFORD, PENNSYLVANIA, ASSIGNOR TO THE U. G. I. CONTRACTING COMPANY, OF PHILADELPHIA, PENNSYLVANIA, A CORPORATION OF DELAWARE.

QUANTITATIVE DETERMINATION OF HYDROGEN SULPHIDE IN ILLUMINATING AND OTHER GAS.

Application filed January 12, 1922, Serial No. 528,860. Renewed March 27, 1924.

*To all whom it may concern:*

Be it known that I, WALTER H. FULWEILER, a citizen of the United States, residing at Wallingford, in the county of Delaware and State of Pennsylvania, have invented a new and useful Improvement in the Quantitative Determination of Hydrogen Sulphide in Illuminating and other Gas, of which the following is a specification.

The principal objects of the present invention are, first, to provide a rapid test for comparatively small quantities, such as from one-tenth to twelve grains per hundred cubic feet, of hydrogen sulphide in illuminating and other gas that can be handled or conducted by comparatively unskilled persons such as the men employed in the purifying house of a gas works; and second, to provide a method for the above purposes which can be practiced by means of portable, compact, simple, reliable and efficient means or apparatus for conducting the test.

In the practice of the invention a carrier or strip of Whatman hardened filter paper is spotted, preferably in spaced circular spots, with solutions of different salts, differently reactive to different concentrations of hydrogen sulphide in the gas for the formation of sulphides of different coloration. A known flow of the gas to be tested is established and the carrier is exposed to the known flow of gas for a definite interval of time and the concentration of the hydrogen sulphide in the gas is estimated or ascertained by the colored sulphides.

In the drawings there is shown apparatus adapted for use in the practice of the method above described and in those drawings Figure 1 is a front view with the front cover removed.

Fig. 2 is a section on the line 2—2 of Figure 1.

Fig. 3 is a side view of one of the parts shown in Figure 1, and

Fig. 4 is a view, drawn to an enlarged scale, of the carrier or strip of filter paper.

The receptacle 1 is provided with a hinged cover 2 and a detachable sliding front, not shown, although the ways 3 in which it slides are shown in Fig. 2. Within the cabinet 1 there is arranged a standard form of hydrogen sulphide tester and the gas under test is passed through it at, for example, the rate of five cubic feet per hour for one minute. This tester comprises the vessel 4 having a detachable stopper 5 fitted with, for example, a five foot Bray burner 6 and with a hook 7. 8 is a deflector in the vessel 4. 9 is a gas inlet for the vessel 4, and it is provided with a valve 10 and with a pressure gauge 11, the purpose of which is to facilitate the maintenance of the desired rate of flow. 12 is a sand glass adapted to measure, for example, intervals of one minute and it is detachably mounted in the cabinet 1 by a spring 13. 14 is a jar for containing strips of filter paper 15. 16 is a stand containing vials for holding the various salt solutions.

The compounds or solutions used arranged in the order of sensitiveness are as follows:

1. Silver sulphate ($Ag_2 SO_4$) Sat. water sol. Gray black sulphide.
2. Copper sulphate ($C_2 SO_4$) 5% water solution. Black sulphide.
3. Antimony trichloride ($SbCl_3$) 3% water solution. Dissolve by adding HCl. Orange sulphide.
4. Cadmium chloride ($CdCl_2$) 5% water solution. Yellow sulphide.
5. Mercuric chloride ($HgCl_2$) 3% water solution. Black sulphide.
6. Bismuth trichloride ($BiCl_3$) 3% water solution. Dissolve by adding HCl. Brown sulphide.

By means of the comb 17 the compounds or salt solutions are applied to the spots on the strip of paper 15. For this purpose the teeth of the comb are dipped into the vials and their ends which may be ground off to the same plane are applied to the strip depositing the compounds on the spots. Proper order can be maintained by spacing some of the teeth of the comb a different distance apart than the others. The numbers on the strip indicate the fraction of a grain or the number of grains of hydrogen sulphide per hundred cubic feet in the gas when the adjacent spot shows its characteristic color under the conditions of the practice of the invention.

In making a test, the teeth of the comb 17 are dipped into the solutions and then pressed on the strip of paper leaving small circular spots of the compounds used. The paper is put into the hydrogen sulphide tester and the gas under test is passed though at, for example, the rate of five cubic feet per hour for one minute. The compounds will show color according to the concentration of hydrogen sulphide in the gas, for example, if the top spot in Fig. 4 is gray-black, the concentration is one-tenth of a grain per hundred cubic feet. If the second spot from the top is black, the concentration is one-third of a grain per hundred cubic feet and so on for the succeeding spots with reference to the table or list of compounds hereinabove set forth. Of course under the conditions assumed the spot furthest from the top of the strip in Fig. 4 that shows color is the one that indicates the concentration of hydrogen sulphide in the gas, and if the concentration is more than twelve grains per hundred cubic feet there are well known methods for quickly ascertaining the concentration of hydrogen sulphide, but it will be evident to those skilled in the art that I have provided a quick and accurate determination of small quantities of hydrogen sulphide in illuminating gas.

16ᵃ is a stand for holding bottles from which the vials 18 can be filled, and the vials 18 are, of course spaced to correspond with the spacing of the teeth of the comb as are also the markings on the strip, so that the application to the strips of the spots of the solutions in proper relative relation is insured.

Obviously modifications may be made in details of construction and procedure without departing from the spirit of the invention which is not limited as to those matters or otherwise than as the prior art and the appended claims may require.

I claim:

1. The method for the quantitative determination of hydrogen sulphide in illuminating and other gas which consists in spotting a carrier with solutions of different compounds differently reactive to different concentrations of hydrogen sulphide in the gas for the formation of sulphides of different coloration, establishing a known flow of the gas to be tested, exposing the carrier to the known flow of gas for a definite interval of time, and estimating the concentration of the hydrogen sulphide in the gas by the colored sulphides.

2. The method for the quantitative determination of hydrogen sulphide in illuminating and other gas which consists in spotting paper with solutions of different salts differently reactive to different concentrations of hydrogen sulphide in the gas for the formation of sulphides of different coloration, exposing the paper to the gas to be tested in measured quantity and for a definite interval of time, and estimating the concentration of the hydrogen sulphide in the gas by the colored sulphides.

3. The method for the quantitative determination of hydrogen sulphide in illuminating and other gas which consists in exposing to the gas different compounds differently color reactive to different concentrations of hydrogen sulphide in the gas, and estimating the concentration of the hydrogen sulphide in the gas by the different colorations.

WALTER H. FULWEILER.